United States Patent [19]
Lewis

[11] Patent Number: 5,477,470
[45] Date of Patent: Dec. 19, 1995

[54] REAL-TIME DIGITAL ORIENTATION DEVICE

[76] Inventor: W. Stan Lewis, 709 Mar Vista Dr., Vista, Calif. 92083

[21] Appl. No.: 262,699
[22] Filed: Jun. 20, 1994
[51] Int. Cl.⁶ .............................. G01C 1/00; G01B 11/26
[52] U.S. Cl. ................... 364/559; 33/363 R; 33/363 K; 33/364; 250/215; 356/147; 356/375
[58] Field of Search ............................. 33/363 R, 363 K, 33/364; 250/215; 356/139.03, 147, 375; 364/559

[56] References Cited

U.S. PATENT DOCUMENTS

| | | | |
|---|---|---|---|
| 2,662,208 | 12/1953 | Wells | 33/36.3 R X |
| 3,128,562 | 4/1964 | Yusa | 33/364 |
| 3,428,789 | 2/1969 | Richard | 364/559 |
| 3,501,966 | 3/1970 | Shapiro et al. | 250/215 X |
| 3,515,888 | 6/1970 | Lewis | 356/375 X |
| 4,132,113 | 1/1979 | Lyman | 73/178 R |
| 4,146,970 | 4/1979 | Edwards | 33/363 K |
| 4,190,962 | 3/1980 | Lyman, Jr. | 33/363 K |
| 4,341,023 | 7/1982 | Marcus et al. | 33/363 K |
| 4,414,753 | 11/1983 | Moulin et al. | 33/356 |
| 4,416,066 | 11/1983 | Romacker | 33/318 |
| 4,488,431 | 12/1984 | Miga | 33/364 X |
| 4,588,992 | 5/1986 | Clark | 343/10 |
| 4,614,041 | 9/1986 | Darton et al. | 33/313 |
| 4,622,843 | 11/1986 | Hormel | 364/559 X |
| 4,694,584 | 9/1987 | Mills | 33/366 |
| 5,046,011 | 9/1991 | Kakihara et al. | 364/449 |
| 5,090,231 | 2/1992 | Gallaher | 73/1 E |
| 5,107,597 | 4/1992 | Kato | 33/355 R |
| 5,131,154 | 7/1992 | Schierbeek et al. | 33/356 |
| 5,237,872 | 8/1993 | Rademakers | 73/505 |
| 5,297,065 | 3/1994 | Cage et al. | 33/356 X |

Primary Examiner—Edward R. Cosimano
Attorney, Agent, or Firm—Thomas Hamill, Jr.

[57] ABSTRACT

A real time directional orientation apparatus is disclosed for use in a two pi (2π) geometry. The apparatus is to be affixed to an object which translates in space. A cylindrical disk is suspended in a fluid in concert with a magnet. The cylindrical disk is disposed inside a cylindrical housing. A light source is in communication with the disk and the light is propagated through the disk where it is finally projected from the disk in a radial fashion. The light beam projected is detected by a bank of photon sensitive detectors lining the interior of the cylindrical housing. The light source is propagated through two coplanar, orthogonal light channels which emanate from the center of the disk in a radial fashion. The photon sensitive detectors register the orientation of the light channels against a known starting value. As the object translates in space, so does its position and orientation, thus causing the magnet to adjust its position in reference to an external magnetic field, such as, but not limited to, the earth's magnetic field. The motion of the magnet causes the cylindrical disk's orientation, and thus the orthogonal, coplanar, light channel's orientation, to change as the object moves. The motion is then detected by the photon sensitive detectors, as both a change in intensity on the detector and centroid position of the propagated light in the detector array. This data is processed by a computer and with ancillary data provided by other sensors provides real time position, path and other navigational, directional and positional data, such as pitch, yaw, attitude and roll.

28 Claims, 6 Drawing Sheets

REAL-TIME DIGITAL ORIENTATION DEVICE

BACKGROUND OF THE INVENTION

This invention relates to the field of navigation devices and more specifically to the field of high resolution directional orientation devices.

A liquid compass typically has a neutrally buoyant magnet assembly, which rotates in a fluid, to provide a directional indication of magnetic north. Such compasses are typically inexpensive, and sold as automobile accessories, or for personal use while hiking, etc.

Also known are compasses which employ a gimbal means to horizontally align a compass card regardless of the orientation of the outer casing. Typically, a gimballed compass utilizes light sensors and an encoded disc to relay positional information electrically through slip-rings. These compasses are expensive, and typically found in marine and aviation navigation apparatus.

U.S. Pat. No. 4,146,970 issuing on Apr. 3, 1979 to Robert Edwards is representative of a remote indicating magnet compass employing an optical shaft encoder responsive to earth's magnetic field.

U.S. Pat. No. 4,416,066 issuing on Nov. 22, 1983 to Bertold Romacker discloses an arrangement for orientation during journeys in land vehicles, which includes a means for ascertaining the distance covered by a vehicle, and a means for ascertaining the changes in direction of the vehicle, to determine the distance covered by the vehicle and/or the current location of the vehicle.

U.S. Pat. No. 4,132,113 issued on Jan. 2, 1979 to Harold Lyman, Jr. discloses a navigation device comprising a magnetic compass, utilizing a compass card having a varying pattern density, a light source, and pairs of sensors responsive to the varying pattern density, and a compensating means for craft pitch and roll.

U.S. Pat. No. 4,614,041 issued on Sep. 30, 1986 to Kenneth Darton discloses a magnetic angular position sensor having a ferrofluid filled spherical chamber in a cylindrical housing, having an odd number of permanent magnets, with Hall effect devices located in recesses in the ends of the cylindrical housing, with a magnetic flux detection means which is responsive to changes in the magnetic flux caused by rotation of the body within the chamber.

U.S. Pat. No. 4,588,992 issued on May 13, 1986 to William Clark discloses a radar tracking system and display comprising a ball type compass having an optical switching circuit for providing azimuth signals indicating the azimuth orientation of the radar unit. An inclinometer having an optical switching circuit for providing a target inclination signal used to determine a target altitude calculation.

U.S. Pat. No. 4,414,753 issuing on Nov. 15, 1983 to Michel Moulin et. al. discloses a process for compensating for the magnetic disturbances for determining a magnetic heading utilizing a computer to define a vector with a reference axis to determine an angle corresponding to the real magnetic heading of the vehicle or aircraft.

These devices all provide for orientation in a plane and provide for no information regarding magnetic declination or out of plane orientation. Also, these devices do not provide for high angular resolution when a shift in directional orientation occurs. It is the object of the present invention to provide both inclination and high angular resolution directional orientation.

Global Positioning Satellites (GPS) provide latitude and longitude with an accuracy tolerance of several meters. The present invention provides precise orientation within the accuracy tolerance of GPS devices. Movement and reorientation of a GPS receiver by a few meters would not be noted by a GPS since such a small movement is within the accuracy tolerance of the GPS receiver. The invention described herein is sensitive to movement and reorientation of a few millimeters.

SUMMARY OF THE INVENTION

This invention discloses an apparatus for real-time digital directional orientation by incorporating both a digital inclinometer and a digital compass in a cylindrical housing. The orientation of the compass magnet is sensed, in real-time, while in motion through a full two pi ($2\pi$) steradians.

This invention provides for both micro-orientation, within the error tolerance of the GPS receiver, and, macro-orientation, high resolution dead reckoning with out reference to a GPS receiver. In relation to micro-orientation: This apparatus is capable of determining very precise bearing, inclination and tracking data relating to robots and other mechanical servo devices, which is well within the accuracy tolerance of a GPS receiver. The real-time directional orientation apparatus disclosed herein, together with associated computer means, will provide a feedback path for moving a robot, or other object from point A to point B, and returning the object by nearly the exact same path, with very high precision. As with any magnetic orientation device the presence of magnetic anomalies will perturb the direction indicated. However, since the invention disclosed is designed to remember an arbitrary motion vector relative to an initial, arbitrary starting point the effects of a constant magnetic anomaly would always be of equal magnitude and opposite direction while retracing a memorized path.

This apparatus can incorporate standard computer visual and vocalization methods to sustain orientation having once traveled a desired path. The invention is to enable the blind to achieve autonomous mobility; to provide navigation assistance for divers or submarines; provide mine field navigation by soldiers or vehicles; provide very precise tracking and aiming; and provide real-time directional orientation where vision is limited and the distance traveled is within the several meter error tolerance of a GPS receiver based device.

In the field of robotics well known sensors for position determination include optical, infrared, sonar, Doppler shift and contact type sensors. These sensors are used principally as collision avoidance sensors, rather than for inherent guidance along a path. This invention will be used in conjunction with or independently of said sensors and provides advantages over collision avoidance sensors. For example the inability of optical and infrared sensors to discriminate location in smoke filled environments and the interference of hot or cold air with sonar and Doppler shift type sensors. This invention can be used for navigation in smoke-filled environments over a wide range of temperatures with out interference.

In relation to macro-orientation: Likewise, the apparatus is capable of determining the real-time position vector of a vehicle, ship or person relative to a fixed starting point. When used with a GPS receiver device, a very high resolution dead reckoning path between two points may be established. When a path is traveled between two GPS reference points, no difference in continuous path inclination is provided by the GPS receiver. The present invention provides path inclination data, and hence elevation changes may be determined with high accuracy and precision relative to a known starting point. In addition the device is designed to be used as a very high resolution real-time dead reckoning device which operates independently of a GPS receiver. In this application the initial, arbitrary starting point is fixed and all motion is stored relative to this point to allow returning to the starting point or other destination.

Further in relation to macro-orientation: The device can be used for high resolution real-time dead reckoning in conjunction with gyroscopes, magnetic flux valves or other well-known navigation devices. The device can be used independently of said devices once an initial relationship between true north and magnetic north, or declination, is defined and the distance traveled is relatively short. For example, the compass device described here-in points to magnetic north. True north corresponds to a line from the center of the cylindrical housing to a point on it's surface which also passes through the north pole. This point and the line from the center of the sphere to the point corresponding to magnetic north define an angle which is the declination of the housing. This angle is continuously recalculated as the housing moves. In addition it is well known that there are circumstances where GPS receivers are unable to receive true signals, such as when in the presence of tall buildings, mountain valleys, severe weather conditions, solar storms or flares, etc, the invention described will not be affected by such conditions.

In reference to the invention described here-in, the term speed as used in this disclosure is construed to be a scalar quantity, a quantity which has only magnitude. The term directional orientation is also a scalar quantity having only magnitude. When each is measured independently and combined the result is a vector quantity, velocity, which has both magnitude and direction.

The real-time directional orientation apparatus disclosed herein comprises a housing forming a cylindrical chamber, with a cylindrical disk disposed in spaced relation therein. Fluid extends between the cylindrical disk and the cylindrical chamber. The cylindrical disk has an appropriate buoyancy to permit it to be suspended in the fluid at a fixed location in the cylindrical housing.

The cylindrical disk has a height, H, where h describes the locus of points between h=0 and h=H. The cylindrical disk also has a radius R, where r describes the locus of points between r=0 and r=R. The cylindrical disk also has a center (C). A plurality of light transmission channels are located in the disk, commencing at the bottom center of the disk located at (r=0, h=0), and traversing to the centroid of the disk located at (r=0, h=0.5H). At this point the light channels split into a first and a second light channel, in orthogonal relation to each other, and traverse in a radial fashion from the center of the cylindrical disk to the edge of the cylindrical disk,(r=R, h=0.5H). At the edge of the cylindrical disk the first and second light channels terminate.

A light source is provided which generates light which is then propagated to the bottom center of the disk at (r=0, h=0). The light is then propagated through the light channel means, by fiber optic elements, along the path through the cylindrical disk defined by the light channel means. A first light channel is precisely orientated with the magnet means in a parallel fashion. The second light channel is offset in an orthogonal fashion from the magnet means and the first light channel. This permits information to be obtained concerning any orientation of the object, and hence the housing of the real-time directional orientation apparatus, including pitch, yaw, roll and attitude.

The aforementioned light transmission channels or source emitter means are spaced interiorly of the cylindrical disk and aligned in relation to a magnet which is disposed atop the cylindrical disk. A plurality of source detector means are disposed in horizontally and vertically spaced radial alignment upon the interior of the cylindrical chamber, to receive the light signals emanating from the source emitter means or light transmission channels in the cylindrical disk.

A computer analyzes the signal from the source detector means to determine the relative real-time position and orientation of the outer housing, in relation to the magnetic north orientation of the magnet means located in proximal relation atop the cylindrical disk.

A speed sensor determines the linear and angular speed of the real time directional orientation apparatus, and data from the source detector means and the speed sensor is used by the computer to determine both the linear and angular velocity the apparatus.

There are two light channel means which may be disposed in a co-planar fashion at about 90 degrees to each other. The 90 degree angle coplanar disposition being the most sensitive to three dimensional motion.

Therefore, it is an object of the present invention to measure changes in angular direction, incorporate the apparatus speed and determine the resultant instantaneous directional or velocity vector. Said changes are determined and recorded as three dimensional translation, through a full two pi ($2\pi$) steradians, in real time and include motion commonly termed as pitch, yaw, roll and attitude.

It is a further object of the present invention to provide that when two of the devices described herein are used in together in both horizontal and vertical alignment to provide for orientation through an approximate four pi ($4\pi$) geometry.

It is a further object of the present invention to determine said vectors with a very high resolution, such as a few tenths of a degree, depending upon the size and number of detectors surrounding the orthogonal, coplanar active source emitters.

It is a further object of the invention to provide that the path an object has traveled is retraceable to a with in a few centimeters, and the path traveled resolution being directly proportional to the number of sensors surrounding the emission sources.

It is still a further object of the invention to accomplish dead-reckoning navigation with high accuracy if the initial position is known with high accuracy, or alternatively, with high precision if the initial position is not known with high accuracy.

It is still a further object of the invention to provide for passive orientation vector determination which is independent of either remote radio broadcast signals or on-board broadcast and measured return signals to accomplish the afore mentioned objectives. The passive device described herein performs these objectives which are accomplished either in conjunction with, or, independently of, electronic navigational aids, such as GPS, gyroscopes, magnetic flux gauges or collision avoidance type sensors (as described generally above).

These together with still other objects of the invention, along with various features of novelty which characterize the invention, are pointed out with particularity in the claims annexed to and forming part of the disclosure. For a better understanding of the invention, its operating advantages and the specific objects obtained by its uses, reference should be made to the accompanying drawings and descriptive matter in which the preferred embodiments of the invention are illustrated.

DESCRIPTION OF THE PREFERRED EMBODIMENT OF THE INVENTION

Figure 1:
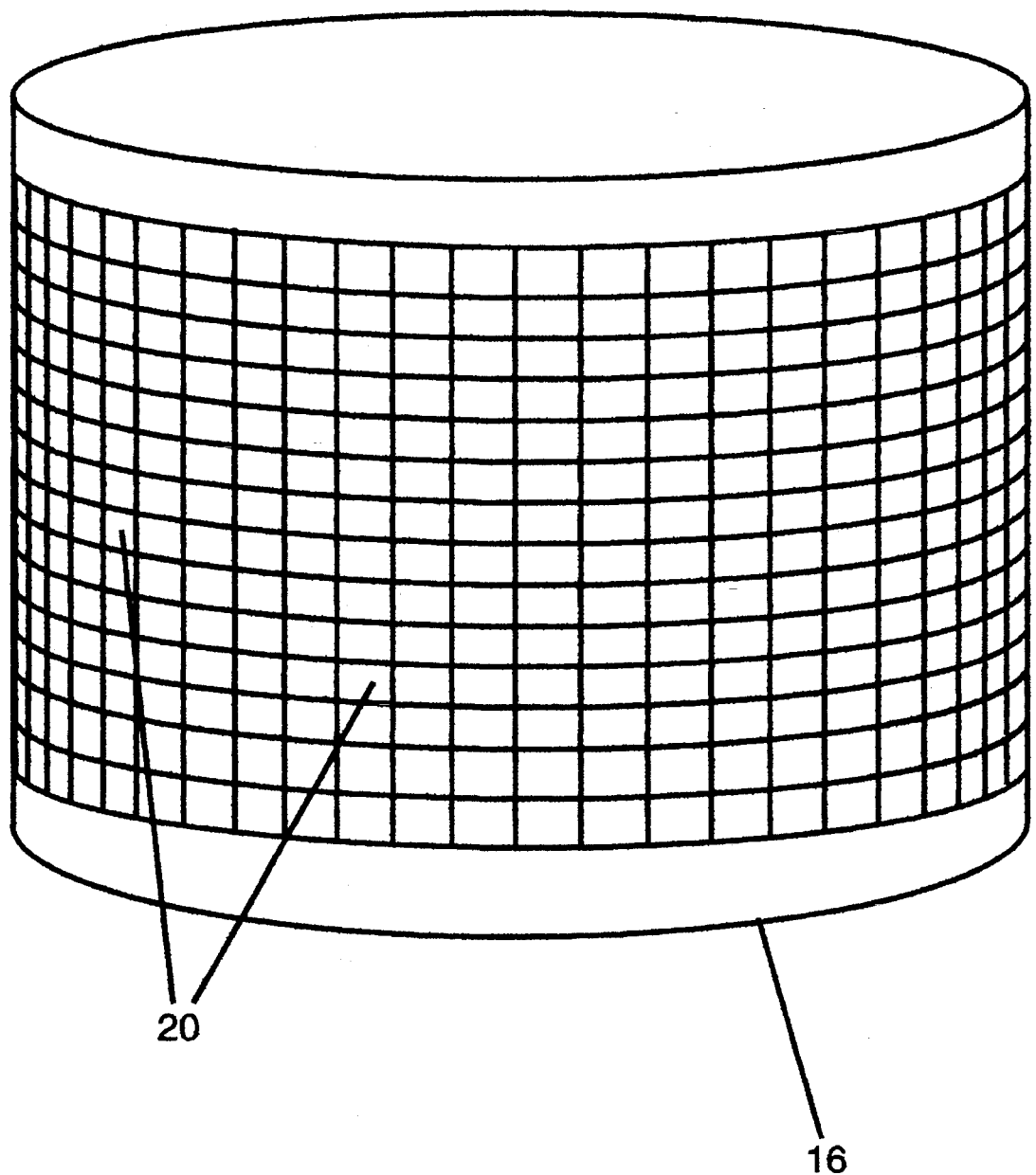
FIG. 1 is a perspective view of the preferred embodiment of the real-time directional orientation apparatus.
Figure 2:
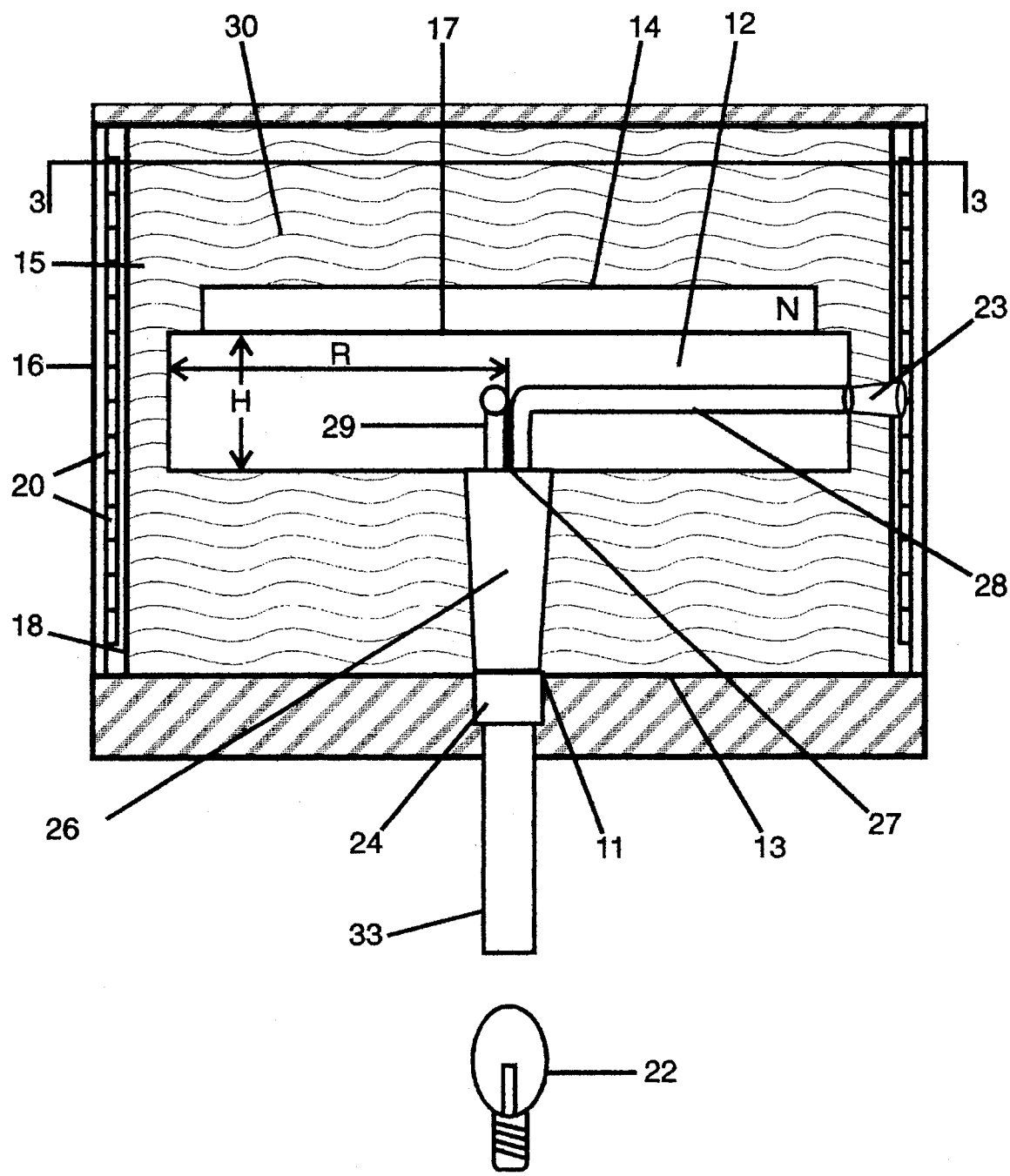
FIG. 2 is a cross sectional view of the preferred embodiment of the real-time directional orientation apparatus.
Figure 3:
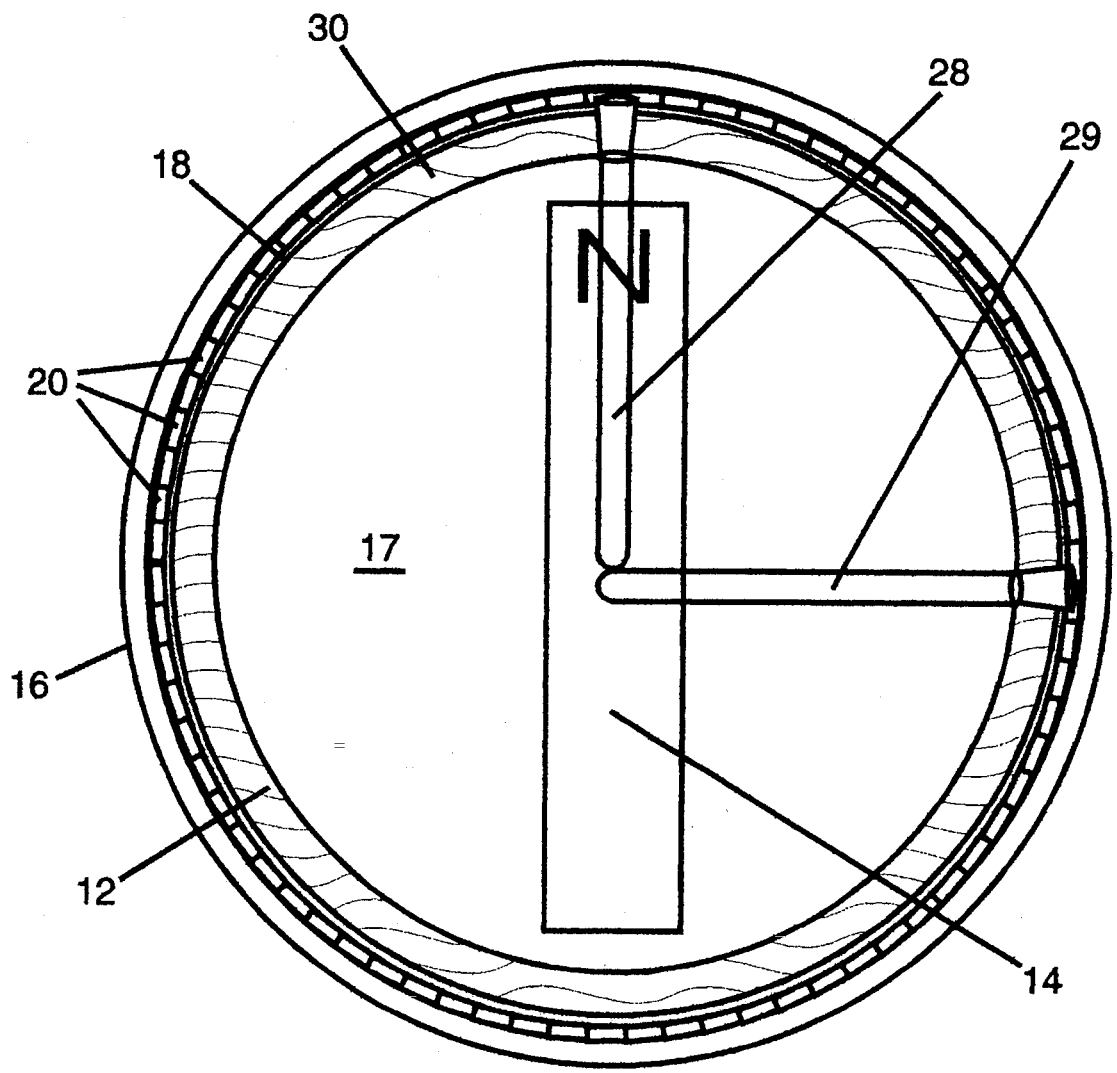
FIG. 3 is a top view taken along line 3—3 of FIG. 2 of the preferred embodiment of the real-time directional orientation apparatus.

Referring now to FIGS. 1–4B, a cylindrical chamber 15 is disposed within a cylindrical housing 16. The cylindrical chamber 15 is filled with a substantially incompressible fluid 30. A series of light detectors 20 are located in the cylindrical housing 16. The detectors 20 are radially aligned about the cylindrical housing 16 in horizontal and vertical alignment. These may be any photon sensitive detectors, including, but not limited to, phototransistors, photodiodes, or photoresistors. The spacing between the adjacent light detector means 20 may be very small, less than one millimeter, thereby providing orientation resolutions 500 microns or less.

The light detector means 20 are protected by a protective surface 18. The protective surface 18 is transparent to the projected light emission 23 and protects the detector means 20 from fluid 30. A cylindrical disk 12 is centrally located in the cylindrical chamber 15 immersed completely in fluid 30. The cylindrical disk 12 is buoyant and weighted and its specific gravity is such that it is suspended in the fluid 30 without any support approximately at the middle of the cylindrical chamber 15. The fluid 30, preferable fills, without void, the inside of the cylindrical chamber 16. The fluid 30, is substantially incompressible, and provides equal pressure in all directions, to ensure that the cylindrical disk 12 does not forcibly contact the housing wall 15, or the protective surface 18 disposed thereon.

The cylindrical disk 12 has a directional magnet means 14 secured to the top of the disk 17, the directional magnet means 14 bisects the disk top 17 across its diameter. The directional magnet means 14 is of sufficient strength to orient the cylindrical disk 12 in relation to a magnetic field, such as, but not limited to, magnetic north on Earth. Where the intended use of the real-time directional orientation apparatus 10 is beyond the influence of the Earth's magnetic field, or as applications dictate, another magnetic field may be used. The directional magnet means 14 continuously aligns itself with a magnetic field, such as magnetic north, as the cylindrical housing moves in concert with the object to which it is secured. As the magnet means continuously aligns itself, the disk 12 is also aligned in concert with the magnet means.

The cylindrical chamber 15 has an opening 11 in its bottom wall 13, the opening 11 being at the center of the bottom wall 13. A light spreading means 24 is located in the opening 11. A light source means 22 is disposed exteriorly of the cylindrical chamber 15 and projects light through a fiber optic cable 33 to the beam spreading element 24. The light source 22 generates a light signal. The light signal is in communication with the cylindrical chamber 15 by channel 33. The light is spread into a light cone 26.

The cylindrical disk 12 has a height, H, where h describes the locus of points between h=0 and h=H. The cylindrical disk 12 also has a radius R, where r describes the locus of points between r=0 and r=R. The cylindrical disk also has a center (C). The disk 12 had a first light channel means 28 and a second light channel means 29 which form a path for light to travel through the disk 12. The first channel means 28 and second light channel means 29 are preferably fiber optic cable. The first channel means 28 and second channel means 29 are essentially located in the same position from the points on the disk (h=0, r=0) to (h=0.5H, r=0). At the geometric centroid of the disk 12 the first light channel diverges from the second light channel. The first light channel 28 and second light channel 29 remain coplanar; however, they are orthogonal to each other and extend radially to the outer edge of the disk 12 defined as the point (r=R).

The first light channel means 28 and second light channel means 29 are aligned in relation to the directional magnet means 12. In this fashion, the first and second light channel means have known directional orientation.

The first light channel means 28 and the second light channel means 29 capture and propagate the light emitted from the beam spreading element 24. This light would then be projected on the cylinder housing 14 at two points, the points separated by 90 degrees. The projected light 23 would then stimulate a response from the light detectors 20, that response reflecting the location and intensity of the light detected. A high sampling rate will be utilized, which would allow detection of the pitch, yaw and roll in any circumstances.

Figure 4A:
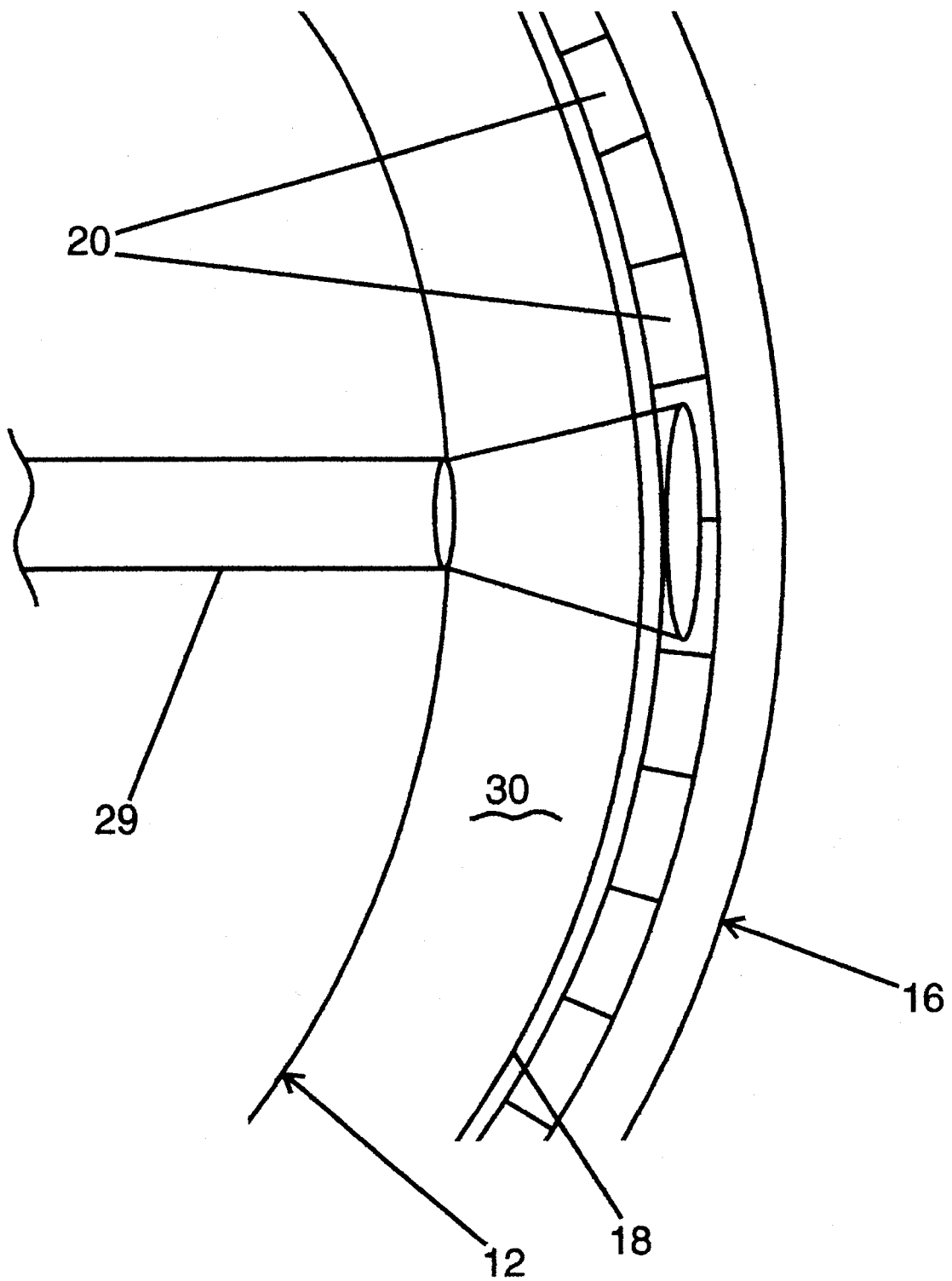
FIG. 4A is a schematic of the geometry of the source emitter and corresponding detectors illuminated by the source emitter.
Figure 4B:
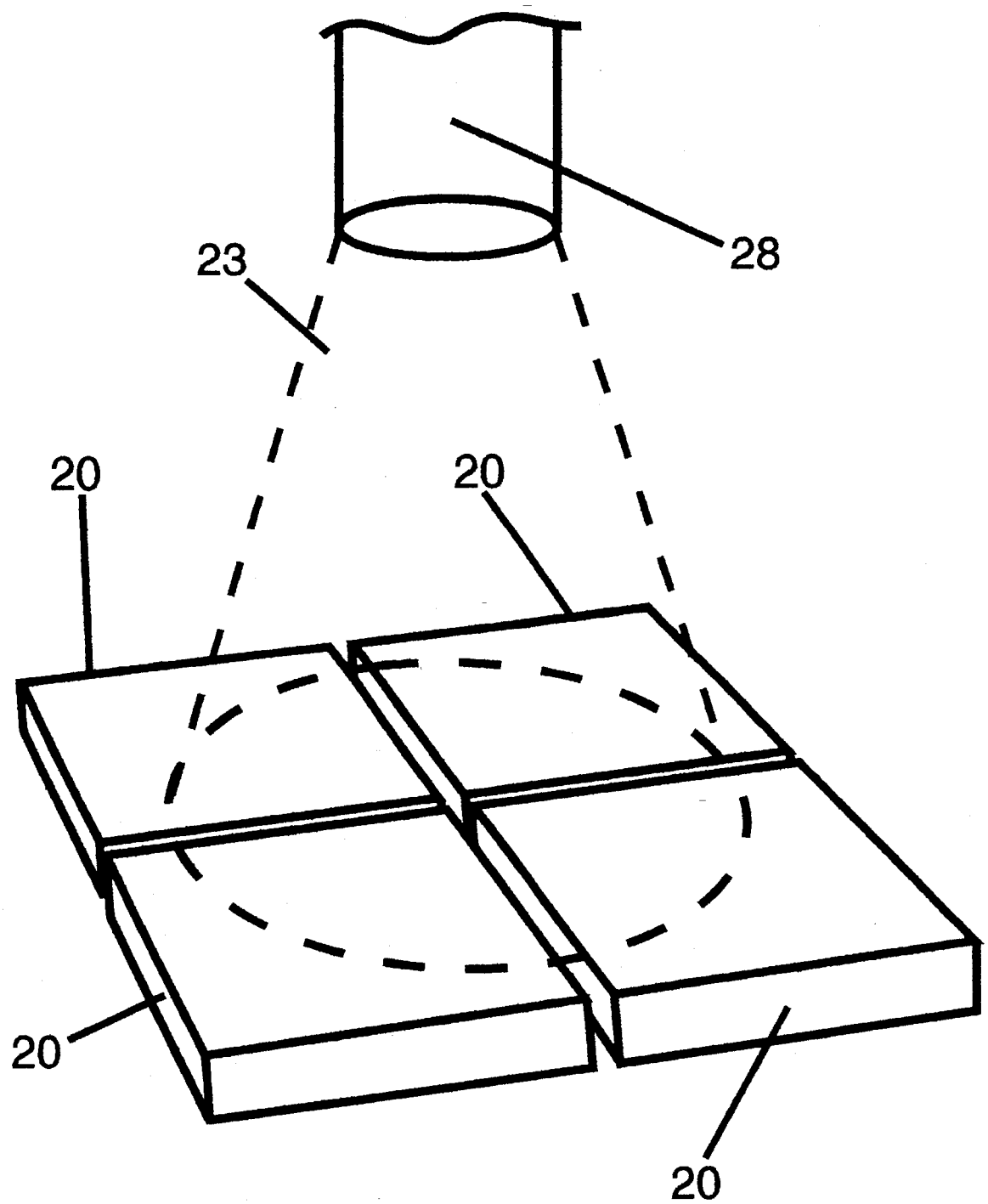
FIG. 4B shows a view of the emission cone from the source describing the relationship between the detector area and the area of the projected emission cone.

In FIG. 4A is illustrated the emission or illumination cone from the source and the preferred relative size relationship between the source and the detectors disposed about the housing. The FIG. 4B illustration is used to further indicate the source/detector geometry. As depicted in FIG. 4B the centroid of the illumination cone from the emission source is the geometric center of the four detectors shown. Said centroid is thus the direction indicated by the emission illumination and corresponds to a virtual point on the spherical housing. Said illumination striking the detectors has an area of approximately twice the sensitive area of said detectors.

As the object moves in space the directional magnet means 14 aligns itself with some external magnetic field, such as the Earth's magnetic field. This in turn causes the first and second light channel means to change orientation. The first and second light channel means, 28 and 29, respectively, each project a light beam 23, which also changes orientation, these light beams are detected by the light detector means 20 located on the cylindrical housing 16. There are two light beams 23 generated, one from the first light channel 28, and one from the second light channel 29. The intensity of light received coupled with the positional data of which specific light detector means are stimulated, generate a signal corresponding to the orientation of the magnet means 14. The signal is combined with other data and information, such as that generated by a speed indicator, coupled with other ancillary data 101, and then is processed by a computer 90. Through signal processing and computer calculations, the matrix of intensity values on the individual detectors, coupled with the location of the detectors which are stimulated, and the speed information may be integrated and used to generate a directional or velocity vector. It is important to be clear that this gives proximate three dimensional translational data, as the buoyant cylindrical disk may rotate both up and down as well as right and left as it is suspended in the incompressible fluid 30. The buoyant cylindrical disk is allowed to rotate freely in a plane and at an approximate 45 degree angle, in any direction, out of the plane. The integrated volume the disk subtends is thus two pi ($2\pi$) steradians.

Figure 5:
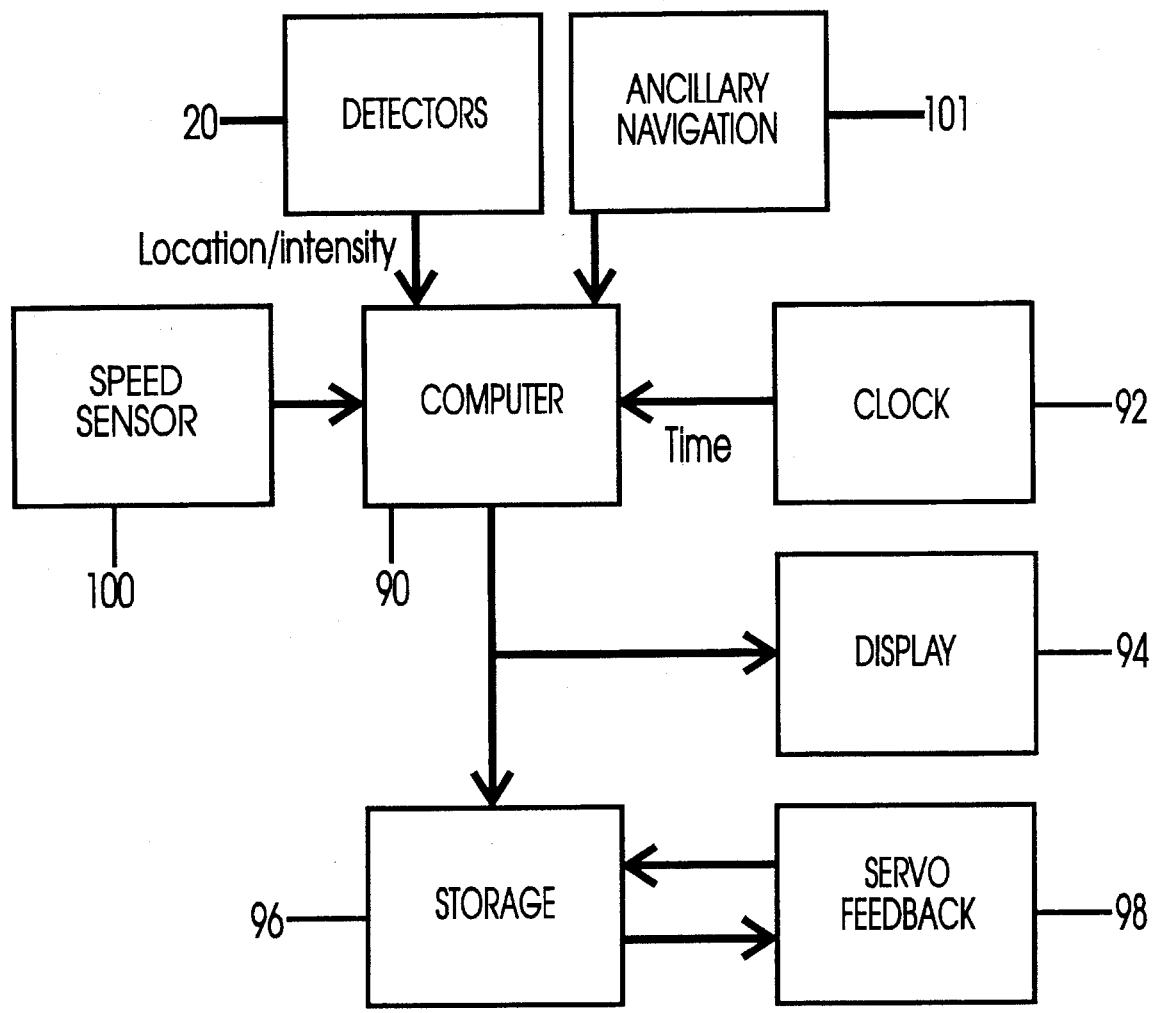
FIG. 5 is a block diagram showing the relationship between logical components of the preferred embodiment of the real-time directional orientation apparatus.

Referring now to FIG. 5, each light detector means 20 is preferably independently polled by a computer 90, using a priori information from the previous polling sample. For example, the computer 90 need not poll all detectors sequentially. Rather, the computer 90 preferably preferentially polls the light detector means 20 nearest to the previous signal received from the first and second light channel means, 28 and 29 respectively.

The signal sent from the first and second light channel means, 28 and 29 respectively, and detected by the light detector means 20, is processed by a computer means 90, which notes the duration, location and intensity of the signal from the first and second light channel means, 28 and 29 respectively. For purposes of this disclosure, computer means 90 is intended to include both computer hardware and software, as known in the art.

A separate speed sensor means 100 is used to determine the linear and angular speed of the directional orientation apparatus 10. Speed sensor means 100 for various moving bodies constitute well known technology, known to one of skill in this art, and thus are not further detailed herein.

The combination of scalar speed from speed sensor means 90, scalar location/intensity data from detector means 20 are integrated by the computer means 90 to provide a real-time orientation vector useful for obtaining navigation information relating to the directional orientation apparatus 10, and the object or apparatus to which it is secured or attached. For purposes of this disclosure, the object or apparatus to which it is secured may be a robot, vehicle, boat, satellite, aircraft, missile, individual, or other known moving body.

The data from the computer means 90 may be processed using known or standard software and logic, for display on a multi dimensional display. The data may also be stored in a storage device 96 in order to be utilized at a later date. Calculated position data may be displayed on appropriate multi dimensional display devices 94. A clock 92 will generate the appropriate time and frequency flags to assist the computer 90 in position data generation in real time. Feedback 98 from the device will enable a change in course or position to be implemented by a decision making protocol which bi-directionally addresses a servo-mechanism.

In such a manner, dead reckoning navigation may be realized, as well as the generation of very high resolution directional vectors. Through utilization of the instant invention, one will be able to retrace the path an object has travelled with a high degree of precision.

Computer 90 also receives information from ancillary navigation device 101, as dictated by application. Such devices include, but are not limited to; gyroscopes, magnetic flux valves, GPS receivers, etc.

OPERATION OF THE PREFERRED EMBODIMENT OF THE INVENTION

A light source 22 is provided which generates a light signal. The light signal is in communication with the cylindrical chamber 15 by channel 33. Channel 33 may be a fiber optic cable, or another form of light channel. A beam spreading element 24 is provided which spreads the light beam into a spread beam 26. The spread beam 26 is of sufficient intensity to penetrate the fluid 30 in such a fashion to be received by the first and second light channel means 28 and 29, respectively. The point of reception is shown as 27. The spread beam 26 is also of a great enough intensity to allow the first and second light channel means to propagate a light beam 23 of a sufficient intensity to be detected by light detector means 20.

The first light channel means 28 is aligned with the north pole of the magnet means 14, and the light projected 23 from the first light channel means corresponds to the direction of the north pole of the magnet means 14. As the cylindrical chamber 15 moves in concert with the object to which the cylindrical housing 16 is secured, the magnet means 14 and the first light channel means 28 maintain an orientation with an external magnetic field or magnetic north. The second light channel means 29 is coplanar and orthogonal to the first light channel means 28. Each light detector means 20 has a specific location on the cylindrical housing 16, one of which then must correspond to magnetic north or some other applied magnetic field. This light detector means location, and all points between the light detector means correspond to virtual reference points on the cylindrical chamber 16, each of which is a unique direction relative to both true north and magnetic north. The virtual points between the light detector means 20 are calculated by interpolation of the relative intensity of each light detector means 20. Light detector intensities are determined relative to the light detector means having the highest intensity.

The first and second light channel means, 28 and 29, respectively, each emit a light beam 23, which illuminates a plurality of light detector means 20. By utilizing two beams 23 the pitch, yaw and roll may be ascertained. The area of the illumination is an area approximately twice that the active area of the light detector means 20. When the light beam 23 is aligned directly on the center of one of the light detector means 20, then the location of this light detector means 20 is aligned with the magnetic north field, or other external magnetic field, since the adjacent source detector means each receive the same relative fraction of the light beam's 23 intensity. This information is used to generate an intensity matrix whose centroid corresponds to the direction of the magnetic means 14, which, in this case, would be centered on of the light detector means 20.

When a displacement of the housing 16, which indicates motion of the apparatus to which it is secured occurs, the magnet means 14 oscillates, seeking a new equilibrium position in relation to the magnetic field orientation. A new intensity balance is calculated be the computer means 90 by sampling the light detector means 20 and sensing a change in both the absolute and relative illumination intensities. A new maximum intensity location can be determined as long as the sampling and calculation rate is significantly greater then the rate of displacement of the first and second light channel means, 28 and 29, respectively, and the magnet means 14.

A typical sampling rate, using available analog to digital converters is in the kilohertz range, much faster than the magnet means 14, and thus the first and second light channel means, are likely to change position. Since the oscillation of the cylindrical disk is dampened by the fluid 30, the oscillation frequency is harmonic, and can be determined by evaluation of the illumination intensity matrix generated by the light source detector means 20 during the first few oscillations.

Signal averaging from the illuminated light detector means 20 allows a new virtual orientation to be calculated and stored, and/or displayed every few milliseconds. Sampling rates in the megahertz range and calculations in the microsecond range are also realistic using currently available technology.

The new intensity matrix is determined relative to the light detector means 20 which receives the highest intensity illumination. A new virtual location of the magnet directional orientation is calculated and that position is representative of magnetic north or alignment with an external magnetic field. All virtual positions of the light detector means 20 and the object which is secured to the housing 16 are shifted by the same amount.

The results of these calculations provide a scalar direction. A speed sensor means 100 provides output in relation to the scalar direction. As the scalars, speed and direction, are continuously updated by the computer means 90, the distance and direction traveled between light detector means 20 sequential illuminations can be determined. The net result is real-time path traveled vector from a known starting point.

DISCUSSION OF OTHER EMBODIMENTS OF THE INVENTION

A second embodiment of the real-time directional orientation apparatus has been considered where the cylindrical disk would be buoyant in a gaseous fluid, such as on an air bearing. A column or columns of air would suspend the cylindrical disk. A column would be provided with a pivot mount to which the cylindrical disk would be mounted. An air path would be provided through the column. The light beam would be generated by a light source, and then propagated through the column by a series of lenses, reflectors and beam spreaders. The air path may be about the sides of the column.

Thus, while the real-time directional orientation apparatus has been fully described and disclosed, numerous modifications will become apparent to one of ordinary skill in this art, and such adaptations and modifications are intended to be included within the scope of the following claims.

What is claimed is:

1. A real-time directional orientation apparatus, for determining the directional orientation of an object, comprising:
   a) a housing having a wall forming a cylindrical chamber;
   b) a cylindrical disk disposed in spaced relation within the cylindrical chamber;
   c) a fluid means disposed between the cylindrical disk and the cylindrical chamber;
   d) a light source means,
   e) a light channel means having a directional orientation disposed within the cylindrical disk, the light channel means in communication with the light source means, the light channel means providing a beam of light of sufficient strength to pass through the fluid means;
   f) a plurality of source detector means disposed in horizontally and vertically spaced, radial alignment on the wall of the housing, the source detector means positioned to receive the beam of light from the light channel means, and to transmit data from the source detector means regarding the relative intensity of the beam of light received from the light channel means;
   g) a magnet means disposed atop the cylindrical disk, the magnet means having a directional orientation relative to magnetic north or other external fixed magnetic field, the directional orientation of the magnet means being in fixed relation to the directional orientation of the light channel means; whereby the beam of light from the light channel means is sensed by at least one of the plurality of source detector means, to determine the relative real time position and orientation of the housing, in relation to the magnetic north orientation of the magnet means located atop the cylindrical disk.

2. The apparatus of claim 1, wherein the light channel means include a first light channel and a second light channel.

3. The apparatus of claim 2, wherein the first light channel and the second light channel are angularly separated by ninety degrees at an edge of the cylindrical disk.

4. The apparatus of claim 3 wherein the cylindrical chamber has a bottom wall and the cylindrical disk has a bottom.

5. The apparatus of claim 4, wherein the light source is in communication with the first light channel means and the second light channel means by a first communication means.

6. The apparatus of claim 5 wherein the first communication means is a fiber optic cable, the fiber optic cable is intermediate the light source and the bottom wall.

7. The apparatus of claim 1, wherein data from the source detector means is analyzed by a computer every few milliseconds by means of signal averaging, to determine the real-time directional orientation of the apparatus.

8. The apparatus of claim 1, wherein a speed sensor is secured to the housing to determine the linear and angular speed of the real time directional orientation apparatus.

9. The apparatus of claim 8, wherein a computer samples a plurality of data signals from the source detector means and the speed sensor, to determine both the linear and angular speed of the apparatus, to determine a real-time orientation vector.

10. The apparatus of claim 8, wherein a computer receives a plurality of real-time data samples from the source detector means, and preferentially analyzes data showing the highest relative intensity of the data signal from the last real-time data signal received, to preferentially sample those source detector means located nearest to the highest relative intensity of the last data signal, at a sampling speed sufficient to determine the real-time position and orientation of the outer housing in relation to the magnetic north orientation of the magnet means located atop the cylindrical disk.

11. The apparatus of claim 1, wherein data from a speed sensor is integrated by a computer with a scalar direction determined by the real-time directional orientation apparatus to provide real-time location and path traveled vectors from a known starting point.

12. The apparatus of claim 1, wherein a selected sampling rate of a relative intensity signal from the source detector means, is greater than a relative movement rate of the light channel means.

13. The apparatus of claim 12, wherein the selected sampling rate of the relative intensity signal from the source detector means is measured in the kilohertz range.

14. The apparatus of claim 2 wherein the first light channel and the second light channel are fiber optic cables.

15. A real-time directional orientation apparatus, for determining the directional orientation of an object, comprising:

a) a housing having a wall forming a chamber;

b) a disk disposed in spaced relation within the chamber;

c) a fluid means disposed between the disk and the chamber;

d) a light source means, e) a light channel means having a directional orientation disposed within the disk, the light channel means in communication with the light source means, the light channel means providing a beam of light of sufficient strength to pass through the fluid means;

f) a plurality of source detector means disposed on the wall of the housing, the source detector means positioned to receive the beam of light from the light channel means, and to transmit data from the source detector means regarding the relative intensity of the signal received from the light channel means;

g) a magnet means fixed to the disk, the magnet means having a directional orientation relative to an external fixed magnetic field, the directional orientation of the magnet means being in fixed relation to the directional orientation of the light channel means; whereby the light beam is sensed by at least one of the plurality of source detector means, to determine the relative real time position and orientation of the housing, in relation to the magnetic north orientation of the fixed magnet means.

16. The apparatus of claim 15 wherein the light channel means includes a first light channel means and a second light channel means.

17. The apparatus of claim 16 wherein the first light channel means and the second light channel means are coplanar and oriented in an orthogonal fashion.

18. The apparatus of claim 16 wherein the first light channel means and the second light channel means are fiber optic cables.

19. The apparatus of claim 17 wherein the chamber has a bottom wall and the disk has a bottom.

20. The apparatus of claim 19, wherein the light source is in communication with the first light channel means and the second light channel means by a first communication means.

21. The apparatus of claim 20 wherein the first communication means is a fiber optic cable, the fiber optic cable is intermediate the light source and the bottom wall.

22. The apparatus of claim 15, wherein data from the source detector means is analyzed by a computer every few milliseconds by means of signal averaging, to determine the real-time directional orientation of the apparatus.

23. The apparatus of claim 15, wherein a speed sensor is secured to the housing to determine the linear and angular speed of the real time directional orientation apparatus.

24. The apparatus of claim 23, wherein a computer samples a plurality of data signals from the source detector means and the speed sensor, to determine both the linear and angular speed of the apparatus, to determine a real-time orientation vector.

25. The apparatus of claim 23, wherein a computer receives a plurality of real-time data samples from the source detector means, and preferentially analyzes data showing the highest relative intensity of the data signal from the last real-time data signal received, to preferentially sample those source detector means located nearest to the highest relative intensity of the last data signal, at a sampling speed sufficient to determine the real-time position and orientation of the outer housing in relation to the magnetic north orientation of the magnet means located atop the cylindrical disk.

26. The apparatus of claim 15, wherein data from a speed sensor is integrated by a computer with a scalar direction determined by the real-time directional orientation apparatus to provide real-time location and path traveled vectors from a known starting point.

27. The apparatus of claim 15, wherein a selected sampling rate of a relative intensity signal from the source detector means, is greater than a relative movement rate of the light channel means.

28. The apparatus of claim 15, wherein the selected sampling rate of the relative intensity signal from the source detector means is measured in the kilohertz range.

\* \* \* \* \*